W. H. BAILEY.
PIPE-COUPLING.
No. 187,343.            Patented Feb. 13, 1877.
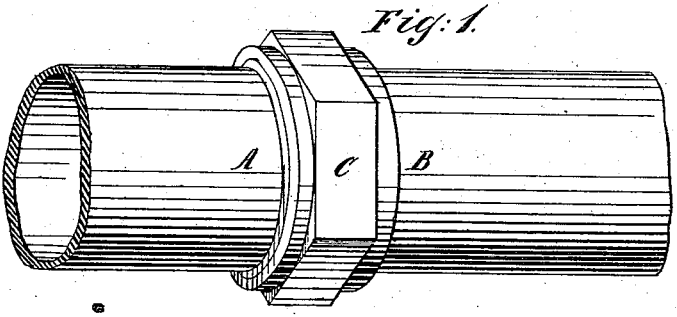
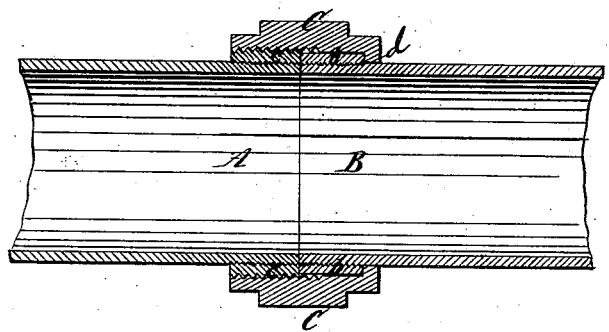
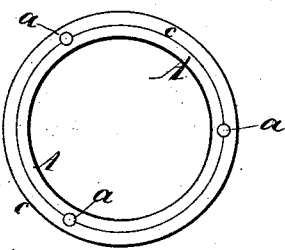
Witnesses                           Inventor
Chas. H. Forbes                William H. Bailey
Henrietta Schwartz

UNITED STATES PATENT OFFICE.

WILLIAM H. BAILEY, OF NEW YORK, N. Y.

IMPROVEMENT IN PIPE-COUPLINGS.

Specification forming part of Letters Patent No. 187,343, dated February 13, 1877; application filed June 9, 1876.

*To all whom it may concern:*

Be it known that I, WILLIAM H. BAILEY, of the city, county, and State of New York, have invented a new and Improved Pipe-Coupling; and I hereby declare the following to be a full, clear, and exact description thereof, reference being had to the accompanying drawing, forming a part of this specification, in which—

Figure 1 is a perspective view of the adjoining sections of a pipe and coupling-nut. Fig. 2 is a section of the same. Fig. 3 is an end view at the joint, showing a means of securing the collars.

The object of my invention is to secure a a firm and close connection of adjoining sections of pipes for various purposes; and it consists in the construction and arrangement of the several parts, as hereinafter fully described and claimed.

A and B represent adjoining sections of a pipe or tube. C is a coupling-nut, the chambered portion of which is of sufficient diameter to pass over the plain collar $b$, and is provided with a female thread to engage with a corresponding male thread upon the collar $c$ of the adjoining section. A circumferential flange, $d$, is also provided, the internal diameter of which is equal to the external diameter of the main portion of the section B. This flange engages with the plain collar $b$, and allows the nut to be turned freely thereon, and, when the nut is engaged with the threaded collar $c$, the sections are drawn firmly together and secured. The collars $c\ b$ are attached to the tubes by a fine thread, (shown in Fig. 2,) and are held in place, or prevented from unscrewing, by means of a key inserted in grooves formed in the separable parts.

When the ends of the sections are made true a close joint is secured without the use of packing; but a suitable packing may be used if desired.

Having thus fully described my invention, what I claim, and desire to secure by Letters Patent, is—

A coupling for the connection of metal pipes or tubes, consisting of the removable collars $c\ b$, secured at the adjoining ends thereof, substantially as shown, one of said collars being provided with an external thread to engage with the internal threaded portion of the nut C, and the other made plain and engaging with the flange $d$, as set forth.

WILLIAM H. BAILEY.

Witnesses:
CHAS. W. FORBES,
HENRIETTA SCHWARTZ.